(12) United States Patent
Nagel et al.

(10) Patent No.: US 7,481,041 B2
(45) Date of Patent: Jan. 27, 2009

(54) EXHAUST SYSTEM AND METHOD FOR OPERATING THE SAME

(75) Inventors: Thomas Nagel, Engelskirchen/Bickenbach (DE); Andrée Bergmann, Eisenach-Hötzelsroda (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 139 days.

(21) Appl. No.: 11/125,551

(22) Filed: May 9, 2005

(65) Prior Publication Data

US 2006/0248877 A1    Nov. 9, 2006

Related U.S. Application Data

(63) Continuation of application No. PCT/EP02/12472, filed on Nov. 8, 2002.

(51) Int. Cl.
*F02M 25/06* (2006.01)
*F01N 3/00* (2006.01)

(52) U.S. Cl. ............................. 60/279; 60/278; 60/302

(58) Field of Classification Search .................. 60/278, 60/279, 302
See application file for complete search history.

(56) References Cited

U.S. PATENT DOCUMENTS

| | | | | | |
|---|---|---|---|---|---|
| 1,795,037 | A | * | 3/1931 | Portail | 123/545 |
| 3,566,610 | A | * | 3/1971 | Fiore | 62/5 |
| 3,855,980 | A | | 12/1974 | Weisz et al. | |
| 4,735,186 | A | * | 4/1988 | Parsons | 123/3 |
| 5,272,125 | A | * | 12/1993 | Weible et al. | 502/242 |
| 5,357,908 | A | | 10/1994 | Sung et al. | |
| 5,419,878 | A | * | 5/1995 | Honma | 422/177 |
| 5,845,486 | A | * | 12/1998 | Yamashita et al. | 60/274 |
| 5,928,981 | A | * | 7/1999 | Leyrer et al. | 502/64 |
| 6,092,512 | A | * | 7/2000 | Ma | 123/568.15 |
| 6,125,629 | A | * | 10/2000 | Patchett | 60/286 |
| 6,276,130 | B1 | * | 8/2001 | Ito et al. | 60/278 |
| 6,367,256 | B1 | * | 4/2002 | McKee | 60/605.2 |
| 6,685,900 | B2 | | 2/2004 | Domesle et al. | |
| 6,691,509 | B2 | * | 2/2004 | Hoffman et al. | 60/286 |
| 6,823,666 | B2 | * | 11/2004 | Odendall | 60/297 |
| 2002/0034466 | A1 | * | 3/2002 | Konig et al. | 423/212 |
| 2004/0086441 | A1 | * | 5/2004 | Hori et al. | 423/213.5 |
| 2004/0237515 | A1 | * | 12/2004 | Takaya et al. | 60/301 |
| 2005/0081514 | A1 | * | 4/2005 | Nakada | 60/286 |

FOREIGN PATENT DOCUMENTS

| | | |
|---|---|---|
| EP | 0 128 299 A1 | 12/1984 |
| EP | 1 129 764 A1 | 9/2001 |
| GB | 2 161 212 A | 1/1986 |
| JP | 08 338 320 | 12/1996 |
| JP | 2000 045881 | 2/2000 |
| JP | 2000 146 465 | 5/2000 |

* cited by examiner

*Primary Examiner*—Thomas Denion
*Assistant Examiner*—Loren Edwards
(74) *Attorney, Agent, or Firm*—Laurence A. Greenberg; Werner H. Stemer; Ralph E. Locher

(57) ABSTRACT

An exhaust system for a mobile combustion engine includes at least one exhaust pipe. The exhaust pipe has at least one catalytically active reaction chamber, inside which long-chain hydrocarbons contained in the exhaust gas are cracked. A method for operating such an exhaust system is also provided.

21 Claims, 2 Drawing Sheets

000
EXHAUST SYSTEM AND METHOD FOR OPERATING THE SAME

CROSS-REFERENCE TO RELATED APPLICATION

This application is a continuing application, under 35 U.S.C. § 120, of copending International Application No. PCT/EP2002/012472, filed Nov. 8, 2002, which designated the United States.

BACKGROUND OF THE INVENTION

Field of the Invention

The present invention relates to an exhaust system of a mobile combustion engine or mobile internal combustion engine and to a method for operating the same. The exhaust system is understood in principle as meaning all types of exhaust systems, for example for spark-ignition engines, diesel engines and other types of engines in which a fuel containing carbon is burned.

Hydrocarbon mixtures are produced and consumed in large quantities. Hydrocarbon is the name given to an organic compound, which includes only the elements carbon and water. Short-chain hydrocarbons with up to four carbon atoms are gaseous at room temperature. The hydrocarbons from pentane ($C_5$) are liquid at room temperature. Long-chain hydrocarbons from heptadecane ($C_{17}$) are solid, wax-like substances. The various hydrocarbons are generally obtained by distillation of mineral oils or fossil fuels. In Germany, the greatest proportion of the total amount is made up of fuels (gasoline and diesel) for automobile traffic. Depending on its origin and how it is processed, gasoline is composed in various forms and is a mixture of aliphatic hydrocarbons ($C_5$ to $C_{12}$), often mixed with unsaturated naphthalenes and aromatics.

With regard to the preparation of higher-grade motor fuel for engines in the automotive sector, it is known to provide agents which make it possible to convert the fuel to higher octane numbers. For example, U.S. Pat. No. 3,855,980 and U.S. Pat. No. 5,357,908 disclose catalytically active cracking reactors which crack long-chain hydrocarbons in the fuel mixture, or convert them to short-chain hydrocarbons. The motivation therefor was to accomplish the most effective possible combustion of the fuel with low harmful emissions. However, one problem was that the storage and/or transport of the short-chain and highly flammable types of hydrocarbons was too dangerous to offer them directly as fuel.

In view of the fact that more recent gasoline or diesel fuels are supplied with relatively high octane or cetane numbers, and moreover the harmful emissions are effectively reduced by a wide variety of components in the exhaust system, there is currently no reason to crack the fuel supplied to the combustion engine.

In the operation of exhaust systems which are provided with flow regulators (such as for example throttle valves, valves, etc.) or else have components for treating the exhaust gases (such as for example mixers, flow baffles and the like), occasionally relatively premature failures or restrictions in use are encountered with regard to the aforementioned components. For example, there are instances in which throttle valves do not close completely, valves (in particular rotating poppet valves) no longer move over the entire adjusting range, flow separations are observed on flow guiding surfaces or mixers become clogged. All of those changes have a considerable influence on the sensitive setting of the individual components in the exhaust line. Those problems occur in particular in parts of the exhaust system in which there is a relatively low temperature (in particular lower than 300° C.).

SUMMARY OF THE INVENTION

It is accordingly an object of the invention to provide an exhaust system for a mobile combustion engine and a method for operating the same, which overcome the hereinaforementioned disadvantages of the heretofore-known devices and methods of this general type and in which the exhaust system has a simple construction and is inexpensive and the method for operating the exhaust system ensures functional reliability of components in the exhaust system.

With the foregoing and other objects in view there is provided, in accordance with the invention, an exhaust system for a mobile combustion engine. The exhaust system comprises at least one exhaust pipe for exhaust gas. The at least one exhaust pipe has at least one catalytically active reaction chamber for cracking long-chain hydrocarbons, contained in the exhaust gas, in the reaction chamber.

As extensive investigations of various components of the exhaust system have shown, one of the causes of the aforementioned problems can be seen in the tacky, wax-like coking deposits which accumulate in particular in the region of small gaps or interstices. Moving parts such as throttle valves or valves are particularly at risk therefrom. The accumulation of the coking deposits in the region of the lifting or rotating path of the throttle valves and valves has the effect that they are restricted in their freedom of movement. The coking is often caused by long-chain hydrocarbons, which in this region initially form an agglomerate and subsequently lead for example to the sticking of moving parts.

It is now proposed to integrate in the exhaust pipe at least one catalytically active reaction chamber in which long-chain hydrocarbons are cracked. The reaction chamber itself may be part of the exhaust pipe, for example in that the inner surface of the exhaust pipe is provided with a corresponding catalytically active coating. However, it is also possible to integrate the reaction chamber into inner regions of the exhaust pipe as a structural unit. In principle, the position of the at least one reaction chamber is freely selectable, although it should be ensured that the catalyst is also already active in the cold-starting phase of the combustion engine. The cold-starting phase is understood in this connection as meaning the period of time that passes from when the combustion engine is (re)started to when the light-off temperature of the main catalyst in the exhaust system is reached. The light-off temperature of the main catalyst is usually in the range from 260° to 350° C.

In accordance with another feature of the invention, the at least one reaction chamber encloses a catalyst which has such a high acidity that it already cracks long-chain hydrocarbons at temperatures lower than 230° C., in particular lower than 100° C. In a number of trials it has been found that an increased acidity of the catalyst leads to an unexpectedly significant lowering of the reaction temperature with regard to the cracking of long-chain hydrocarbons. In accordance with a further feature of the invention, it is particularly advantageous in this respect that the catalyst includes an activated aluminum silicate. Under some circumstances, it is also advantageous that the catalyst includes boron trifluoride and/or antimony pentafluoride. An X-ray amorphous aluminum silicate ($Al_2O_3/SiO_2$) is used, for example, as the catalyst for the cracking and/or oxidation of the long-chain hydrocarbon. In order to increase the acidity or activation of the catalyst, a zeolite ion exchanger, which is for example coated with a rare earth metal and/or a noble metal such as platinum on an acidic carrier such as aluminum trichloride ($AlCl_3$), is also added. Finally, superacidic catalysts such as boron trifluoride ($BF_3$) and/or antimony pentafluoride ($SbF_5$) may also be used for the activation of the aluminum silicate. What is more, when platinum on aluminum trichloride is used for the activation of the aluminum silicate, reaction temperatures of from 80° C. to 200° C. and servicing periods of up to two years are achieved.

In accordance with an added feature of the invention, the at least one reaction chamber encloses at least one honeycomb body, which serves as a carrier for the catalyst. A honeycomb body is understood as meaning a component which has a multiplicity of passages through which the exhaust gas can flow. Honeycomb bodies of this type may be produced from a large number of different, high-temperature-resistant materials. In this respect, reference should be made to known honeycomb bodies for exhaust gas treatment. In principle, honeycomb bodies of this type can be produced from metal or ceramic. As an alternative to the honeycomb body, it goes without saying that a multiplicity of further components with the effect of increasing the surface area can be disposed in the reaction chamber, such as for example screens, knitted or woven fabrics or the like.

In accordance with an additional feature of the invention, it is particularly advantageous if the honeycomb body has a plurality of at least partly structured sheet metal layers, which are stacked and/or coiled in such a way that passages through which the exhaust gas can flow are formed. The use of layers of metal sheet to produce honeycomb bodies has the advantage that they can be produced with particularly thin walls. For example, sheet metal layers with a thickness of from 12 to 50 μm can be used, achieving passage densities over the cross-sectional area of the honeycomb structure, which lie in the range from 200 to 800 cpsi (cells per square inch). The structured sheet metal layers preferably form passages which are disposed substantially parallel to one another. It is possible under some circumstances for microstructures to be provided to create turbulence, openings for gas exchange into adjacent passages and varying thicknesses of the sheet metal layers.

In accordance with yet another feature of the invention, at least one reaction chamber is disposed upstream of a valve in the direction of flow of the exhaust gas. This is advantageous in particular whenever the valve is part of an exhaust-gas recirculation system and regulates the flow of exhaust gas through an exhaust-gas recirculation pipe. This means in other words that the partial stream of exhaust gas which is passed through the exhaust-gas recirculation system is initially freed of long-chain hydrocarbons due to a corresponding catalytic reaction taking place as it flows through the at least one reaction chamber. The exhaust-gas recirculation system is particularly at risk with regard to the agglomeration of tacky coking deposits in the vicinity of the valve, since relatively low temperatures generally prevail in this part of the exhaust system. This is attributable on one hand to the fact that the exhaust-gas recirculation system is usually used especially in the cold-starting phase, in which the exhaust gas itself is not yet at adequately high temperatures, and to the fact that only relatively small mass flows of exhaust gas are passed through, so that heat dissipation to the exhaust-gas recirculation pipe quickly takes place. To this extent, the configuration of such a reaction chamber specifically in or near to the exhaust-gas recirculation system is particularly effective with regard to the functionality of the valve in the exhaust-gas recirculation system.

In accordance with yet a further feature of the invention, in order to ensure that the reaction chamber is catalytically active even after a relatively long time in operation, an exhaust-gas cooler is disposed upstream of the at least one reaction chamber in the direction of flow of the exhaust gas and/or the at least one reaction chamber itself can be cooled. As already described at the outset, the cracking of long-chain hydrocarbons is primarily concerned at low temperatures. Catalysts which are effective in a temperature range below 200° C. but at significantly higher temperatures no longer have adequate catalytic activity, are usually used therefor. For this purpose it is proposed that the catalyst in the reaction chamber be kept at temperatures lower than 200° C., even if the (uncooled) exhaust gas is already at much higher temperatures. With regard to the structure of the exhaust-gas cooler, heat exchangers known to a person skilled in the art may be used. In this respect it is conceivable on one hand that the exhaust-gas cooler is integrated in the exhaust pipe itself, or is a separate component, which is disposed in the interior of the exhaust pipe or around it. The cooling of the reaction chamber itself may be brought about, for example, by cooling coils, which are externally attached around the reaction chamber.

In accordance with yet an added feature of the invention, the at least one reaction chamber has a volume which is less than 0.8 l (liters), in particular less than 0.5 l and preferably even less than 0.2 l. The size of the volume is also determined, inter alia, by the mass throughput of exhaust gas. This means that, in keeping with the configuration in partial streams of exhaust gas or main streams of exhaust gas, a correspondingly large volume is to be provided. It is also significant how high is the proportion of long-chain hydrocarbons in the exhaust gas. Further criteria for selecting the volume may be the type of catalyst, the sensitivity of the downstream components with regard to coking tendency and/or the temperature of the exhaust gas at the location.

In accordance with yet an additional feature of the invention, there are provided components for converting harmful substances contained in the exhaust gas, which are disposed upstream and/or downstream of the at least one reaction chamber. Components of the exhaust system are intended to mean in particular known filters, particle traps, heating elements, heat exchangers, adsorbers, catalytic converters, etc. It is particularly advantageous in this respect that the reaction chamber substantially has only the task of cracking long-chain hydrocarbons, while the actual conversion of harmful substances such as carbon monoxide, nitrogen oxides, etc is attributable to the aforementioned components.

With the objects of the invention in view, there is also provided a method for operating an exhaust system, in particular for a mobile internal combustion engine. The method comprises providing at least one catalytically active reaction chamber in an exhaust pipe carrying exhaust gas. The exhaust gas is guided through the at least one reaction chamber for cracking long-chain hydrocarbons, contained in the exhaust gas, in the at least one reaction chamber.

This ensures that components of the exhaust system, which have a tendency to suffer coking, such as for example throttle valves, valves, etc, function satisfactorily over a long period of time. This leads to particularly easy servicing and great effectiveness of the exhaust system.

In accordance with another mode of the invention, the exhaust gas that is at least partly cracked in the reaction chamber is fed to an exhaust-gas recirculation system, which returns a partial stream of exhaust gas to a combustion engine. This has the advantage that in turn only short-chain hydrocarbons are provided for the combustion engine, and the latter can carry out a combustion that is effective and produces few harmful substances.

In accordance with a further mode of the invention, the exhaust gas entering the reaction chamber and/or the reaction chamber itself is cooled in such a way that temperatures below 230° C. (preferably lower than 150° C. or even lower than 100° C.) are ensured in the reaction chamber during operation.

In accordance with an added mode of the invention, in particular, in the case of such a procedure, it is advantageous that at least 50%, in particular at least 80%, of the long-chain hydrocarbons contained in the exhaust gas are cracked in the at least one reaction chamber, with normal pressure preferably prevailing in the reaction chamber. This has the consequence on one hand that the reaction chamber itself generally does not become gummed up, and consequently only has to be checked at very infrequent servicing intervals, but on the other hand the coking of downstream components is also prevented.

In accordance with a concomitant mode of the invention, after flowing through the at least one reaction chamber, the exhaust gas only contains short-chain hydrocarbon molecules which have fewer than 10 carbon atoms.

Other features which are considered as characteristic for the invention are set forth in the appended claims.

Although the invention is illustrated and described herein as embodied in an exhaust system and a method for operating the same, it is nevertheless not intended to be limited to the details shown, since various modifications and structural changes may be made therein without departing from the spirit of the invention and within the scope and range of equivalents of the claims, noting that the features of the dependent claims and of the independent claims can be combined with one another in any way desired.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
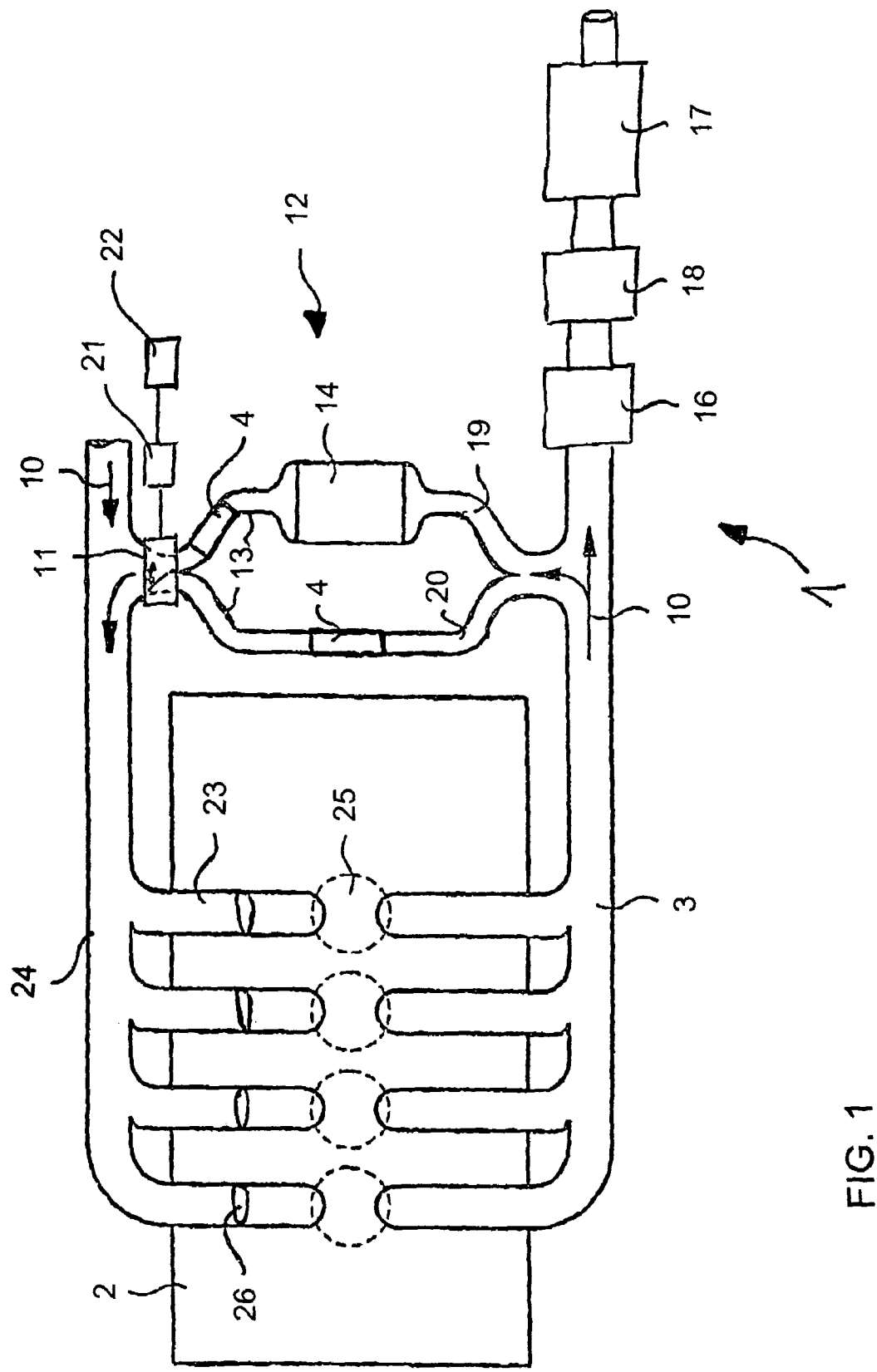
FIG. 1 is a diagrammatic, plan view of a configuration of an exhaust system according to the invention.

Referring now to the figures of the drawings in detail and first, particularly, to FIG. 1 thereof, there is seen a diagrammatic view of a structure of an exhaust system 1 with an exhaust-gas recirculation system 12 and a combustion engine 2. The exhaust-gas recirculation system 12 is formed with two lines, that is to say it includes a first line 19 and a second line 20. An exhaust-gas cooler 14 is disposed in the first line 19, bringing about cooling of a partial stream of exhaust gas flowing through it, in particular at high temperatures of the exhaust gas. Regulation of a direction of flow 10 in the exhaust-gas recirculation system 12 takes place through the use of a valve 11, which is preferably configured as a rotating double valve. A drive 21 of the valve 11 is connected to a control unit 22, so that pre-determinable partial streams of exhaust gas can be produced.

In principle, a fuel-air mixture is fed to the combustion engine 2 through an air-intake pipe 24 and throttle valves 26.

In this respect, it is specifically in the cold-starting phase of the combustion engine 2 with an exhaust-gas recirculation system 12, that coking deposits occur on the feed pipes 24 of the fuel-air mixture with the returned exhaust gas, in particular in the vicinity of the valve 11. Furthermore, the throttle valves 26, valves in combustion chambers or spaces 25 or other regions of feed pipes 23 which at least for a time confine only a relatively small free flow cross section, are affected in particular. The combustion of the fuel-air mixture takes place in the combustion chambers 25 of the combustion engine 2 as shown. Exhaust gases containing, for example, hydrocarbons, carbon monoxides, carbon dioxides and nitrogen oxides, are produced and subsequently passed on through an exhaust pipe 3. Harmful substances contained in the exhaust gas are partly catalytically converted in a downstream emission control system before they are released into the environment. Illustrated components, namely a filter 16, an adsorber 18 and a catalytic converter 17, for example, serve that purpose.

The illustrated device has two reaction chambers or spaces 4 for catalytic oxidation and/or cracking of long-chain hydrocarbons, in which a catalyst 5 (shown in FIGS. 2 and 3) is applied to an inert support in the reaction chambers 4. The reaction chamber 4 itself can be cooled, in addition or alternatively to the exhaust gas cooler 14. The reaction chambers 4 are disposed downstream of the combustion engine 2, and accordingly the fluid flowing through the reaction chambers 4 is directed toward the combustion chamber 2 in the direction of flow 10. Since the catalyst 5 has such a high acidity, the long-chain hydrocarbons are already converted at temperatures lower than 100° C. In the illustrated exemplary embodiment, the reaction chambers 4 are disposed in both exhaust-gas recirculation pipes 13 of the two-line exhaust-gas recirculation system 12, in which the fluid flowing through is a partial stream of exhaust gas to be returned to the combustion engine 2.

Figure 2:
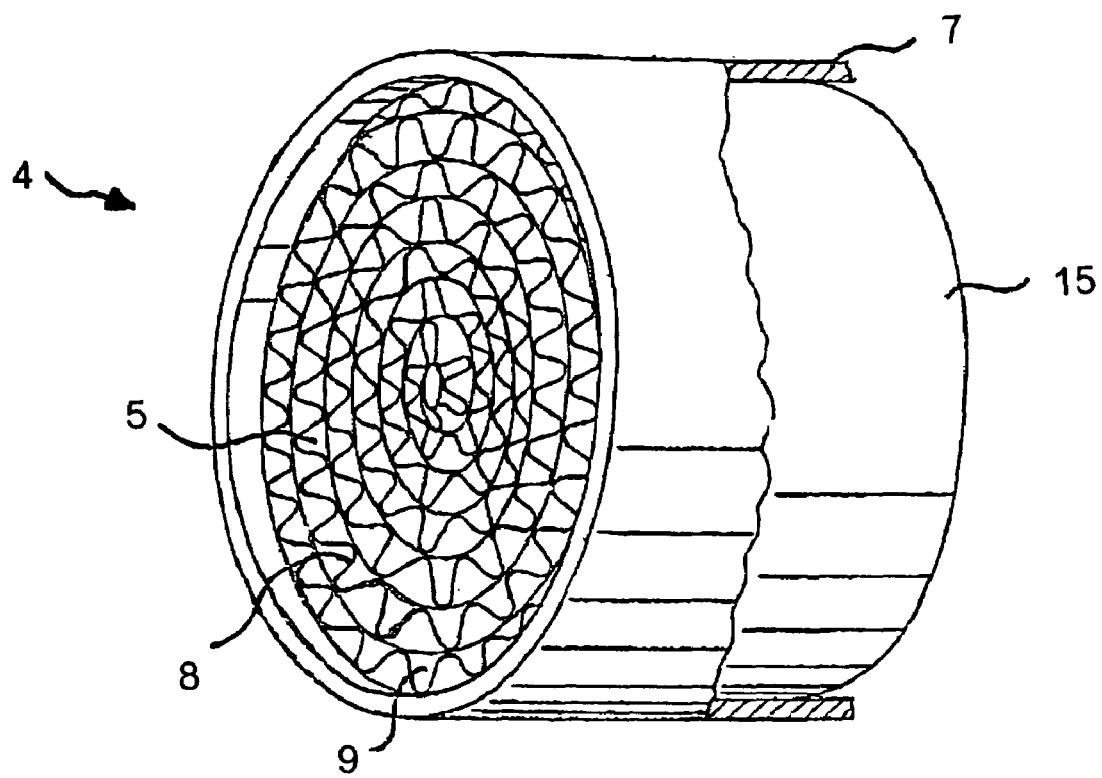
FIG. 2 is a partly broken-away, perspective view of a variant of a reaction chamber.

FIG. 2 diagrammatically and perspectively shows an embodiment of the reaction chamber 4 in which a catalyst 5 is applied to a honeycomb body 7. The honeycomb body 7 is formed as a separate component in the reaction chamber 4. The metallic honeycomb body 7 with passages 9 through which the fluid can flow is formed by at least partly structured sheet metal layers 8. The reaction chamber 4 has a volume 15 of about 0.5 liters (meaning the outer overall volume with wall structures and passages 9) and is disposed near a connection between the exhaust-gas recirculation system 12 (shown in FIG. 1) and the air-intake pipe 24 (shown in FIG. 1), so that with any desired setting of the valve 11 (shown in FIG. 1) the long-chain hydrocarbons are always cracked or catalytically converted in the entire partial stream of exhaust gas to be returned or fed back.

Figure 3:
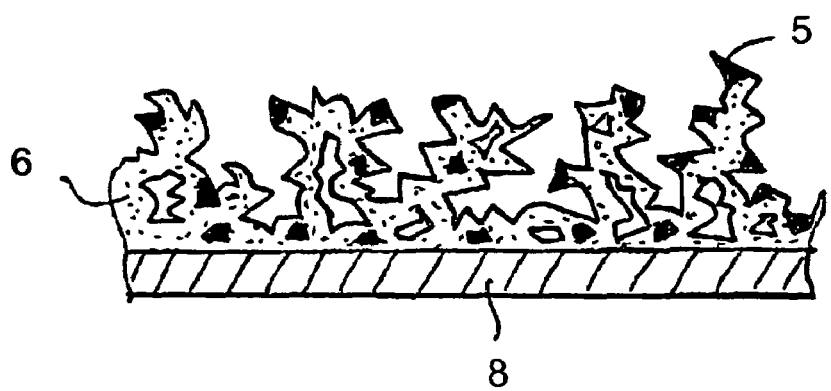
FIG. 3 is an enlarged, fragmentary, cross-sectional view of a structure of a coating of the reaction chamber.

FIG. 3 diagrammatically shows the structure of a coating of the reaction chamber 4. The fragmentary view shows a piece of a sheet metal layer 8 of the honeycomb body 7 on which the coating has been applied with high temperature resistance.

The coating has an extremely fissured surface, as is characteristic of zeolites. The coating is doped with a catalyst 5 and includes aluminum silicate 6. In the present case, the catalyst 5 is activated aluminum silicate 6, and it additionally includes constituents of boron trifluoride and/or antinomy pentafluoride.

The cracking of the hydrocarbons of the fuel also has the effect of making it better accessible and of its chemical energy content being able to be better utilized. This also results in a reduction in the specific carbon consumption. With the aid of this method, the long-chain hydrocarbons of the gasoline, such as for example decane, can for the first time be transformed in the vehicle into short-chain alkanes and, with additional dehydration, also into alkenes, which leads to an improved octane number of the gasoline.

We claim:

1. An exhaust system for a mobile combustion engine, comprising:
    an air intake pipe
    at least one exhaust pipe for exhaust gas, said at least one exhaust pipe having at least one catalytically active reaction chamber for cracking long-chain hydrocarbons contained in the exhaust gas, in said reaction chamber, wherein after flowing through said reaction chamber the exhaust gas contains only short-chain hydrocarbon molecules having fewer than 10 carbon atoms; and
    a valve, said at least one reaction chamber being disposed upstream of said valve in a direction of flow of the exhaust gas;
    said valve and said reaction chamber being part of an exhaust gas recirculation system having an exhaust gas recirculation pipe, said exhaust recirculation pipe distributing exhaust gas into said air intake pipe, said valve regulating a flow of exhaust gas through said exhaust gas recirculation pipe.

2. The exhaust system according to claim 1, wherein said at least one reaction chamber has a catalyst having such a high acidity that it cracks long-chain hydrocarbons at temperatures lower than 230° Celsius.

3. The exhaust system according to claim 1, wherein said at least one reaction chamber has a catalyst having such a high acidity that it cracks long-chain hydrocarbons at temperatures lower than 100° Celsius.

4. The exhaust system according to claim 1, wherein said at least one reaction chamber has a catalyst having an activated aluminum silicate.

5. The exhaust system according to claim 1, wherein said at least one reaction chamber has a catalyst and at least one honeycomb body serving as a carrier body for said catalyst.

6. The exhaust system according to claim 5, wherein said honeycomb body has a plurality of at least partly structured sheet metal layers being at least one of stacked or coiled to form passages through which the exhaust gas can flow.

7. The exhaust system according to claim 1, which further comprises an exhaust-gas cooler disposed upstream of said at least one reaction chamber in a direction of flow of the exhaust gas.

8. The exhaust system according to claim 1, wherein said at least one reaction chamber can be cooled.

9. The exhaust system according to claim 1, wherein said at least one reaction chamber has a volume of less than 0.8 liters.

10. The exhaust system according to claim 1, wherein said at least one reaction chamber has a volume of less than 0.5 liters.

11. The exhaust system according to claim 1, wherein said at least one reaction chamber has a volume of less than 0.2 liters.

12. The exhaust system according to claim 1, which further comprises components for converting harmful substances contained in the exhaust gas, said components being disposed one of upstream or downstream of said at least one reaction chamber.

13. A method for operating an exhaust system, which comprises the following steps:
    providing at least one catalytically active reaction chamber in an exhaust pipe carrying exhaust gas; and
    guiding the exhaust gas through the at least one reaction chamber for cracking long-chain hydrocarbons contained in the exhaust gas, in said at least one reaction chamber, wherein after flowing through the reaction chamber, the exhaust gas contains only short-chain hydrocarbon molecules having fewer than 10 carbon atoms;
    providing a valve, the at least one reaction chamber being disposed upstream of the valve in a direction of flow of the exhaust gas, the valve and the reaction chamber being part of an exhaust gas recirculation system having an exhaust gas recirculation pipe;
    distributing exhaust gas through the gas recirculation pipe into an air intake pipe of a mobile combustion engine; and
    regulating a flow of exhaust gas through the exhaust gas recirculation pipe using the valve.

14. The method according to claim 13, which further comprises feeding the exhaust gas, being at least partly cracked in the at least one reaction chamber, to an exhaust-gas recirculation system returning a partial stream of the exhaust gas to a combustion engine.

15. The method according to claim 13, which further comprises cooling the at least one reaction chamber to ensure temperatures below 230° Celsius in the at least one reaction chamber during operation.

16. The method according to claim 13, which further comprises cooling the exhaust gas entering the at least one reaction chamber to ensure temperatures below 230° Celsius in the at least one reaction chamber during operation.

17. The method according to claim 13, which further comprises cracking at least 50% of the long-chain hydrocarbons contained in the exhaust gas in the at least one reaction chamber.

18. The method according to claim 17, which further comprises maintaining normal pressure in the at least one reaction chamber.

19. The method according to claim 13, which further comprises cracking at least 80% of the long-chain hydrocarbons contained in the exhaust gas in the at least one reaction chamber.

20. The method according to claim 19, which further comprises maintaining normal pressure in the at least one reaction chamber.

21. A method for operating an exhaust system for a mobile combustion engine, which comprises the following steps:
    providing at least one catalytically active reaction chamber in an exhaust pipe carrying exhaust gas from the mobile combustion engine; and
    guiding the exhaust gas from the mobile combustion engine through the at least one reaction chamber for cracking long-chain hydrocarbons contained in the exhaust gas, in said at least one reaction chamber, wherein after flowing through the reaction chamber, the exhaust gas contains only short-chain hydrocarbon molecules having fewer than 10 carbon atoms;
    providing a valve, the at least one reaction chamber being disposed upstream of the valve in a direction of flow of the exhaust gas, the valve and the reaction chamber being part of an exhaust gas recirculation system having an exhaust gas recirculation pipe;
    distributing exhaust gas through the gas recirculation pipe into an air intake pipe of the mobile combustion engine; and
    regulating a flow of exhaust gas through the exhaust gas recirculation pipe using the valve.

* * * * *